United States Patent [19]

Mishima et al.

[11] Patent Number: 4,941,192
[45] Date of Patent: Jul. 10, 1990

[54] METHOD AND APPARATUS FOR RECOGNIZING PATTERN OF GRAY LEVEL IMAGE

[75] Inventors: Tadaaki Mishima, Hitachi; Morio Kanasaki; Masao Takatoo, both of Katsuta; Hideo Ota, Hitachi, all of Japan

[73] Assignee: Hitachi, Ltd., Tokyo, Japan

[21] Appl. No.: 183,689

[22] Filed: Apr. 19, 1988

[30] Foreign Application Priority Data

Apr. 20, 1987 [JP] Japan .................................... 62-97134

[51] Int. Cl.$^5$ ............................................... G06K 9/39
[52] U.S. Cl. ......................................... 382/54; 382/50; 382/18; 382/27
[58] Field of Search ................. 382/54, 27, 18, 22, 382/30, 50, 51, 16, 41, 19

[56] References Cited

U.S. PATENT DOCUMENTS

| | | | |
|---|---|---|---|
| 3,534,332 | 10/1970 | Parks | 382/27 |
| 4,335,427 | 6/1982 | Hunt | 382/54 |
| 4,543,660 | 9/1985 | Maeda | 382/27 |
| 4,700,400 | 10/1987 | Ross | 382/27 |
| 4,783,838 | 11/1988 | Matsunawa | 382/27 |

FOREIGN PATENT DOCUMENTS

| | | | |
|---|---|---|---|
| 0013733 | 2/1977 | Japan | 382/27 |
| 0049482 | 3/1987 | Japan | 382/54 |

OTHER PUBLICATIONS

SAPIRSTEIN: "Improving Low-Illumination Video'-'-NASA Tech. Briefs-Spring 1979-p. 18-USCL 382/54.

Primary Examiner—Reinhard J. Eisenzopf
Assistant Examiner—Jose M. Solis
Attorney, Agent, or Firm—Kenyon & Kenyon

[57] ABSTRACT

In a method of recognizing a pattern of a gray level image the image to be processed is subjected to a normalization process, local gray level feature parameters are extracted from the normalized image at its sampling points, and the pattern is identified by using the extracted feature parameters in accordance with a predetermined recognition procedure. An apparatus for recognizing a pattern of a gray level includes a memory for storing a gray level image having several brightness tone levels, a normalization circuit for normalizing the brightness of the gray level image to be processed, an extraction circuit for extracting local gray level feature parameters from the obtained normality image at specific points, and a recognition circuit for identifying the pattern by using the feature parameters in accordance with a predetermined.

11 Claims, 9 Drawing Sheets

| 20 | 60 | 80 | 60 | 20 |
|----|----|----|----|----|
| 20 | 60 | (80) | 60 | 20 |
| 20 | 60 | 80 | 60 | 20 |

FIG. 12

| 20 | 20 | 20 |
|----|----|----|
| 60 | 60 | 60 |
| 80 | (80) | 80 |
| 60 | 60 | 60 |
| 20 | 20 | 20 |

METHOD AND APPARATUS FOR RECOGNIZING PATTERN OF GRAY LEVEL IMAGE

BACKGROUND OF THE INVENTION

The present invention relates to a method and apparatus for recognizing a pattern such as a character by means of image processing, and more particularly to a method and apparatus for recognizing a continuous brightness value image (hereinafter referred to as gray level image); image received as an image from a television camera or the like without using a quantization process such as binarization.

Character recognition technique has been widely used in practice and is first among other pattern recognition techniques. However, there arise various problems if this technique is applied to general industrial fields. Namely, consider a commonly used optical code reader which aims at reading characters and symbols recorded on a paper. In the industrial application fields, however, characters and symbols are often printed or engraved on various materials so that unevenness in brightness may often occur depending on the lack of printing uniformity or the lighting conditions.

Figure 20:
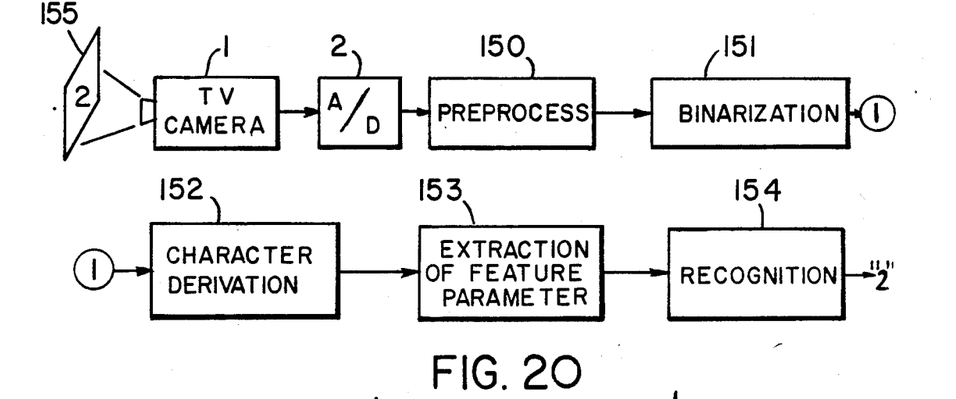
FIG. 20 is a block diagram of a conventional character recognition method.

According to a general character recognition method as shown in FIG. 20, an image of an object 155 such as a character is an input to a television camera 1 and quantized into 6 to 8 bits by an analog/digital (A/D) converter 2 to be written in a gray level image memory (not shown). The data in the gray level image memory are subjected to a pre-processing 150 for removing noises generated by the television camera 1 or quantization noises, and subjected to a binarization process 151 for compressing the data amount. In the binarization process 151, the gray level data are converted into two binary values, "0" and "1", relative to a threshold value.

Figure 21A:
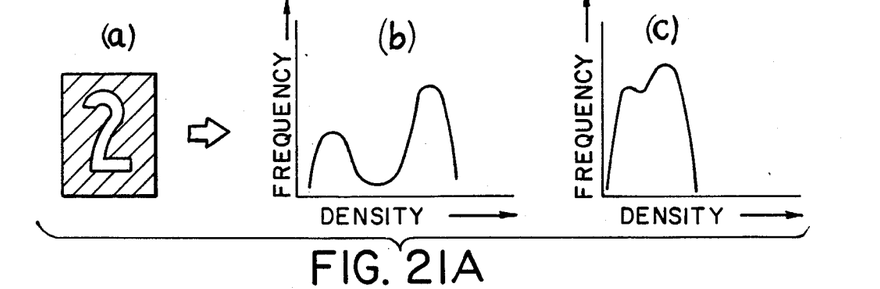
FIGS. 21A and 21B illustrate character binarization.

An obtained binary image is subjected to a character derivation process 152 to pick up a character. The derived character or pattern is subjected to a feature parameter extraction process 153 to extract therefrom feature parameters such as positions of unevenness of the pattern and the number of end points of the pattern. The feature parameters are subjected to a recognition process 154 where they are compared with the previously stored standard pattern data to find a pattern which has the largest number of identical points to the feature parameters. The pattern that is found is an output of the recognition process 154. At the binarization process 151 among the above processes, a double peak pattern of the gray level histogram as shown in FIG. 21A (b) can be obtained if the input gray level image is very clear so that a threshold value for the binarization can be readily determined.

Figure 22:
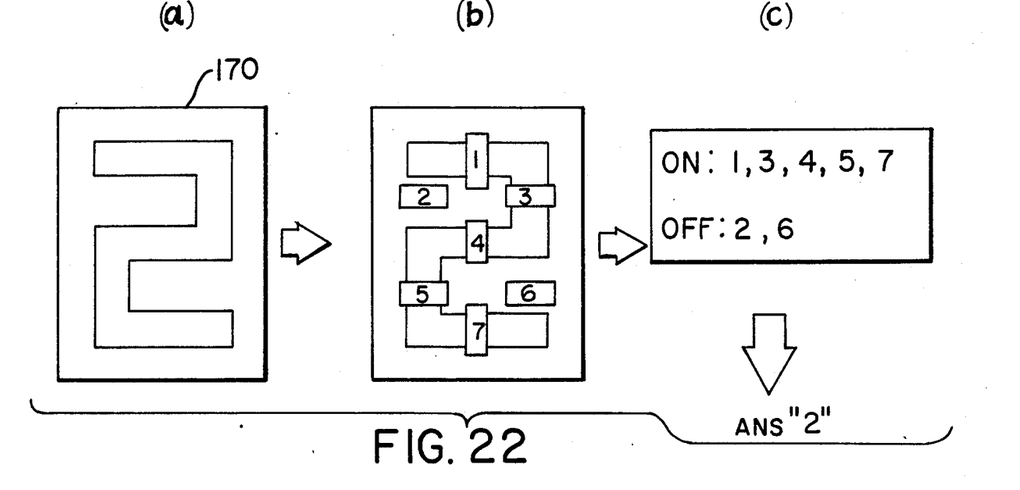
FIG. 22 illustrates a simple character recognition method.

An example of a binary image of a character whose line (contour) can be discriminated distinctively from a background, will be described. FIG. 22 illustrates a method of recognizing a relatively simple character pattern (7 segment character). Check areas 1 to 7 (FIG. 22 (b)) are set at particular positions of a binary image 170 (FIG. 22 (a)) to check if a character line is present within each area. In the case shown in FIG. 22, a character line is present (ON) within the areas 1, 3, 4, 5 and 7, whereas a character line is not present (OFF) within the areas 2 and 6. Such an ON/OFF pattern is characteristic only to a character "2" so that the object image can be recognized as "2". A judgement of ON or OFF can be carried out by checking to what extent lines, i.e., in this case white (binary value "1") values, are included within a local check area.

Figure 23:
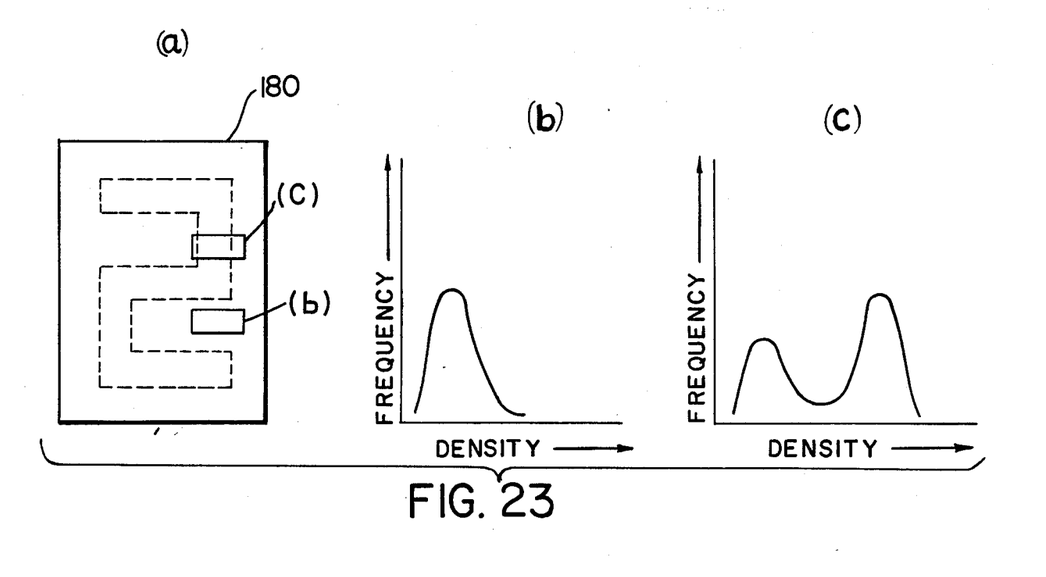
FIG. 23 illustrates the problems accompanied by a method whereby a character is recognized directly from a gray level image.

Alternatively, an example of a gray level image which can be descriminated distinctively because of a certain density difference between a background and a character, will be described. For a gray level image 180, as shown in FIG. 23 (a) for example, wherein a character is bright (high density) and the background is dark, a process for obtaining a density histogram in a check area is performed. FIG. 23 (b) shows a density histogram of a check area within which a character line is not present, and FIG. 23 (c) shows a density histogram of a check area within which a character line is present. Such density histograms are obtained for all the check areas 1 to 7 such as shown in FIG. 22. An objective character can be recognized based on the density feature parameters in the check areas, such as:

(1) Is there any bottom in the density distribution (Are there two peaks)?

(2) The sum, average, or dispersion value of densities.

Figure 21B:
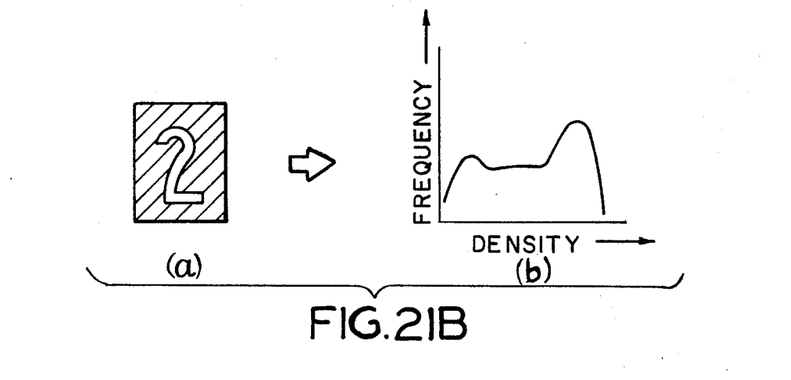

However, the former method which calculates the number of "1" pixels in a check area, poses a problem that an erroneous judgement may be made if a binarization process is not correctly performed due to sensitive response to any breakage in pattern or noises. Further, the latter poses a problem that it becomes difficult to determine a threshold value if illumination is dark and the contrast of a character lowers, similar to the case as shown in FIG. 21A (b). Apart from the above, if there is unevenness in brightness as shown in FIG. 21B, the peaks and bottom of the density histogram become unclear as shown in FIG. 21B (b), resulting in another reason for the difficulty of determining a threshold value. Particularly in the industrial application fields, illumination conditions of an object may vary to thereby cause the brightness distribution to fluctuate up and down considerably. Thus, it becomes difficult to determine a threshold value of binarization. Also, binarization often leads to a broken or broadened line so that erroneous character recognition becomes likely to occur.

As discussed above, a conventional pattern recognition method as well as a character recognition method adheres to a recognition after conversion of a gray level image into a binary image. As a result, it often occurs that a broken or broadened character and pattern cannot be recognized correctly. To recognize it correctly, an apparatus must have a great amount of software and hardware.

SUMMARY OF THE INVENTION

It is an object of the present invention to provide a pattern recognition method which can avoid erroneous recognition even under a change or fluctuation in brightness of a gray level image, or the like.

It is another object of the present invention to provide an apparatus capable of eliminating the above problems and having as an output a stable recognition result even in industrial application fields.

To achieve the above objects, according to a method of recognizing a pattern of a gray level image of a first embodiment of the present invention, a gray level image to be processed is subjected to a normalization process, local gray level feature parameters are extracted from the normalized image at its sampling points, and the pattern is identified by using the extracted feature parameters in accordance with a predetermined recognition procedure.

An apparatus for recognizing a pattern of a gray level image of a second embodiment of the present invention, comprises a memory for storing a gray level image having several brightness tone levels, a normalization circuit for normalizing the brightness of the gray level image to be processed, an extraction circuit for extracting local gray level feature parameters from the obtained normalized image at specific points, and a recognition circuit for identifying the pattern by using the feature parameters in accordance with a predetermined recognition procedure.

With the above construction, it becomes possible to make the gray level image have a constant contrast by extracting local gray level feature parameters from the normalized image. Namely, if there is no character line, the image has only a dark density distribution, whereas if there is a character line, the image has both dark and bright density distributions. Consequently, if a binary image has blurs or noises, the number of "1" increases or decreases to large extent. However, even if a gray level image has blurs, this blur portion is left as pixels having middle density values so that no error occurs as in the case of a binary image.

DETAILED DESCRIPTION

The embodiments of the present invention will now be described with reference to the accompanying drawings.

Figure 3:
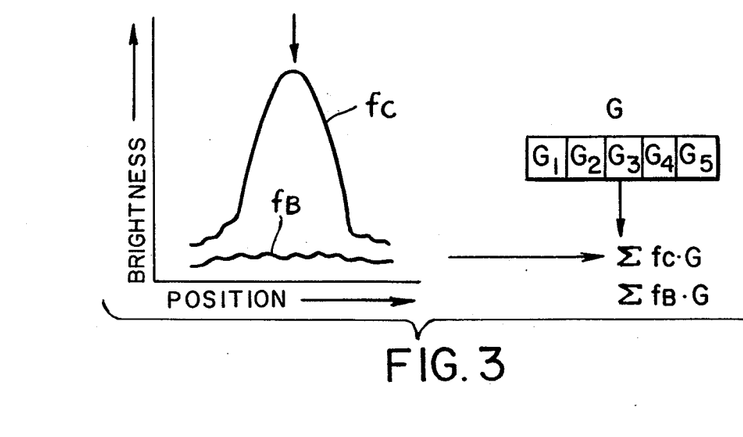
FIG. 3 illustrates how local gray level feature parameters are extracted at sampling points.
Figure 18:
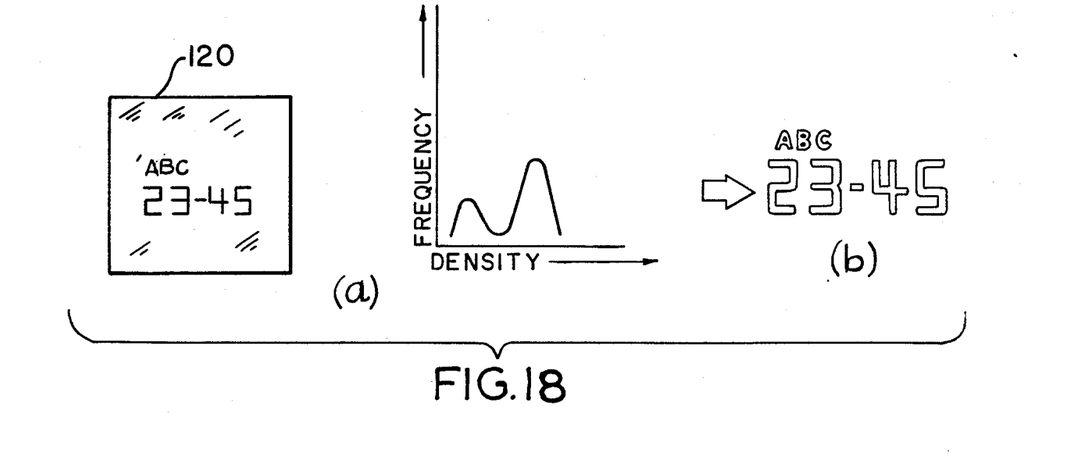
FIGS. 18 and 19 illustrate a character position detection method in a complicated background.

Referring to FIG. 3, a change in brightness where a character line is present on one horizontal line within a check area shown in FIG. 18 is represented by $f_C$, and a change in brightness where a character line is not present (only a background) is represented by $f_B$. The brightness distribution is subjected to a multiplication/addition calculation $\Sigma f \cdot G$ by using a filter G ($G1<G2>G5<G4<G3$, for example $G1=8$, $G2=32$, $G3=64$, $G4=32$, and $65=8$). A large difference in brightness at a center of a check area (indicated by an arrow in the figure) can be observed between the case where a character line is present and the case where a character line is not present, by using the filter G. The reason for this is that by using a filter matching the case where a character line is present, a large value of $\Sigma f \cdot G$ is obtained for the case where a character line is present, whereas a small value is obtained for the case where a character line is not present.

In the industrial application fields, the illumination conditions of an object may vary extensively so that the brightness distribution shown in FIG. 3 also varies up and down to large extent. This means that the value $\Sigma f \cdot G$ varies greatly so that it becomes impossible to determine a threshold value for the discrimination between both the cases.

The invention will be described as to local gray level feature values with which it is possible to carry out normalized processing of an image so that is may be possible to judge whether there is a character line or not even if the illumination changes.

Figures 1, 2:
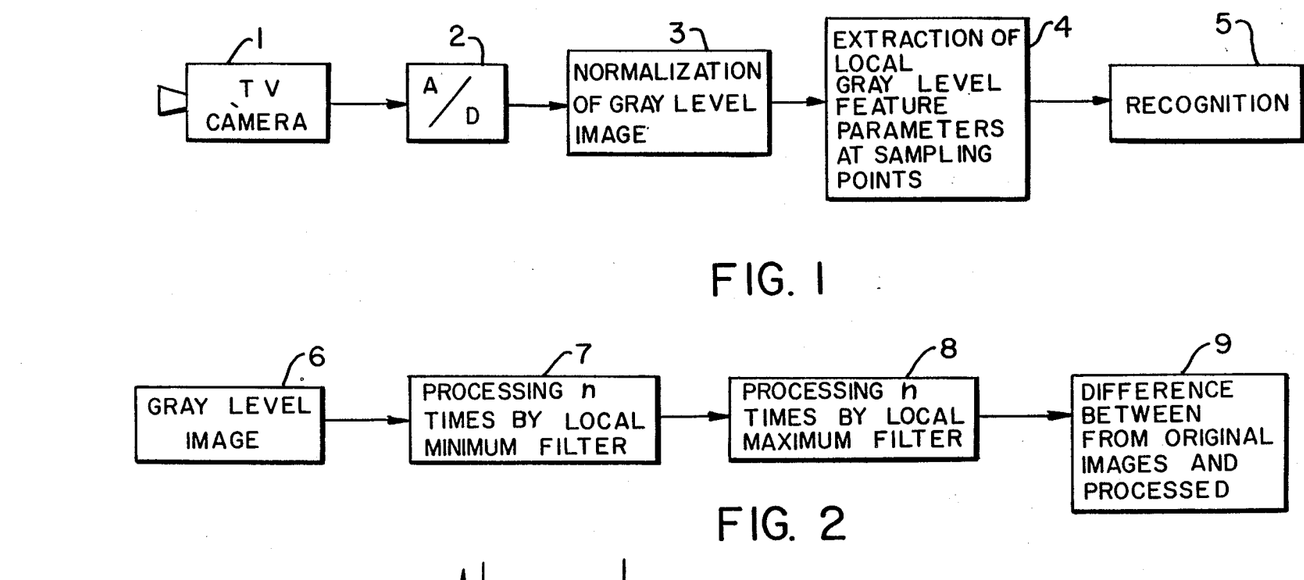
FIG. 1 is a block diagram illustrating a pattern recognition method according to a first embodiment of the present invention.
FIG. 2 is a block diagram showing a normalization process for a gray level image.

FIG. 1 is a block diagram showing the fundamental structure of a pattern recognition method of an embodiment of the present invention, wherein an image obtained from a television camera 1 and subjected to an A/D conversion at an A/D converter 2 first undergoes a gray level image normalization process 3. Thereafter, local halftone feature parameters such as $\Sigma f \cdot G$ are extracted from the normalized image at its sampling points to thereafter perform a recognition process 5.

Figure 4:
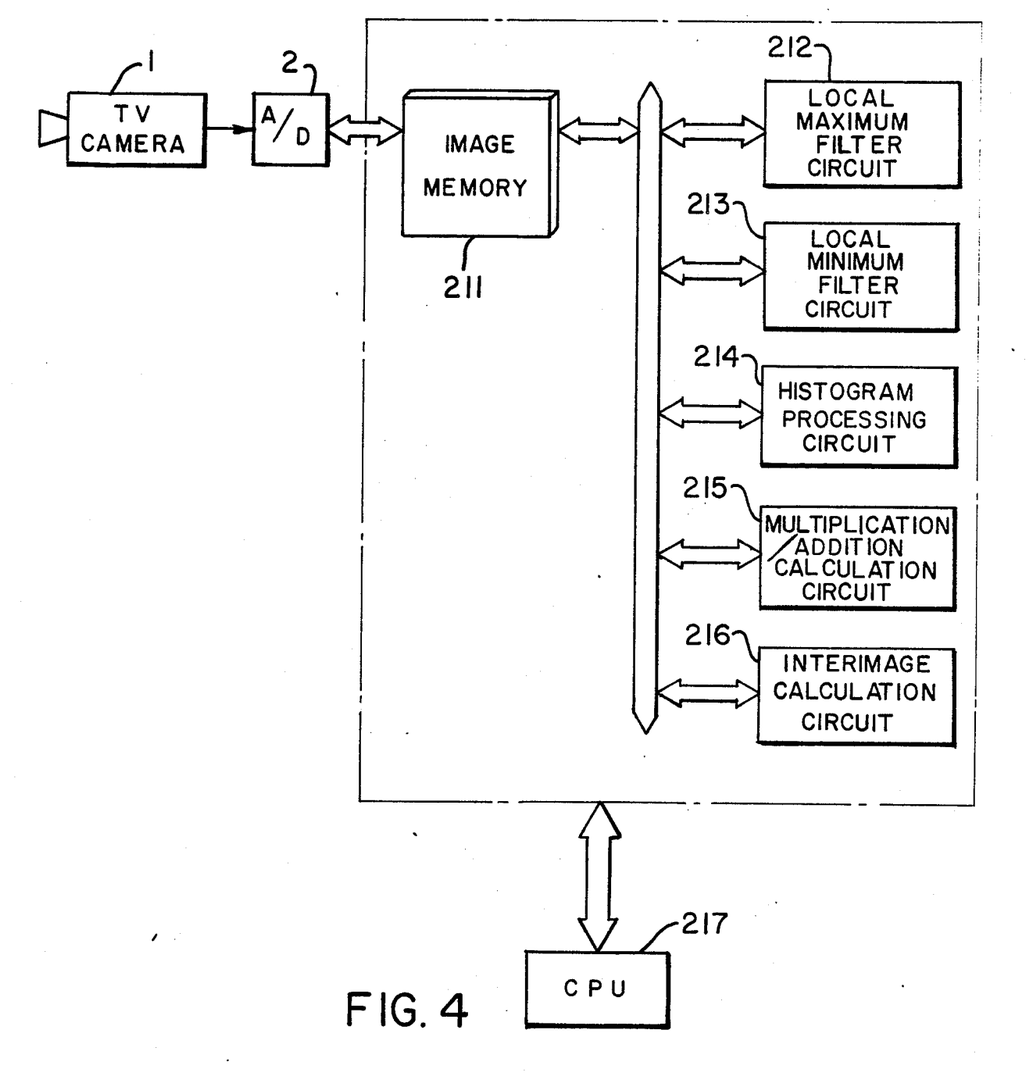
FIG. 4 is a block diagram illustrating a pattern recognition apparatus according to a second embodiment of the present invention.

FIG. 4 shows the structure of an apparatus realizing the above pattern recognition method. The apparatus comprises an image memory 211 for an image having tone levels in the order of 6 to 8 bits, a local maximum filter circuit 212 and a local minimum filter circuit 213 for obtaining an envelope surface image, a histogram processing circuit 214, a multiplication/addition calculation circuit 215 for calculating $\Sigma f \cdot G$, and an inter-image calculation circuit 216 for obtaining a difference image between images. The apparatus also includes a central processing unit 217 (CPU) for activating various circuits and performing a recognition process using the values $\Sigma f \cdot G$.

The image normalization and the local gray level feature parameter extraction will be explained.

(i) Normalization of a gray level Image

FIG. 2 is a block diagram showing the normalization process applied to the case where a character is bright and the background is dark.

The processing for a gray level image will be described in particular, taking a one-dimensional image as an example for the purpose of simplifying the description.

Figure 5A:
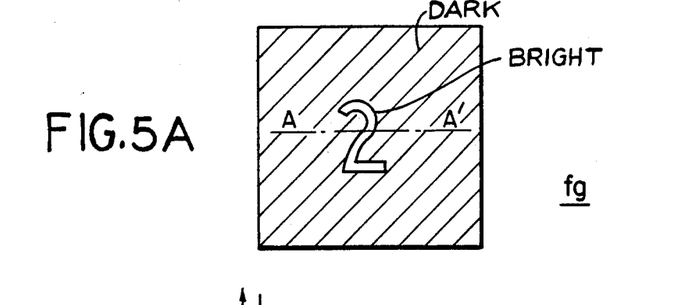
FIGS. 5A to 5E illustrate image processing.
Figure 5B:
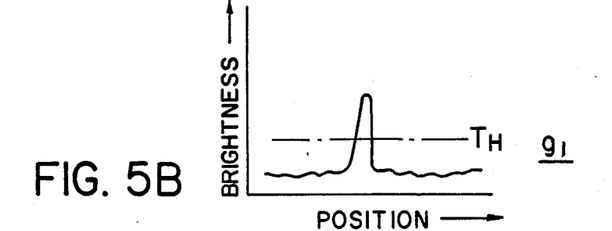

FIG. 5A shows a gray level image to be processed (hereinafter called an input image), the image at line A—A' being shown by g1 in FIG. 5B wherein the abscissa represents a position and the ordinate represents a brightness. Generally it is possible to derive a character out of the background through binarization using a threshold value $T_H$ whereby a brighter portion than $T_H$ is made "1" and a darker portion is "0". However, the threshold value $T_H$ is used as a fixed or definite value, therefore, it is hard to determine a proper threshold value for the case where the brightness of an input image varies.

Figure 5C:
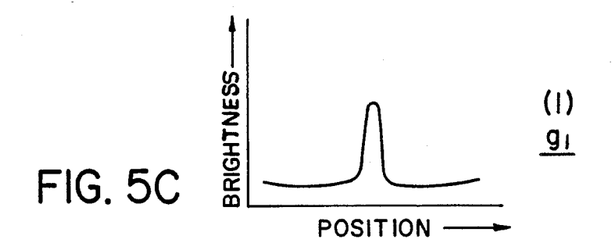
Figure 5D:
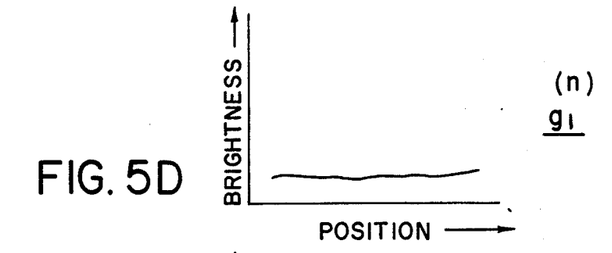
Figure 5E:
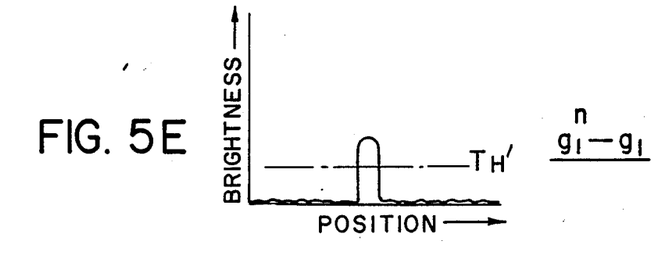
Figure 6:
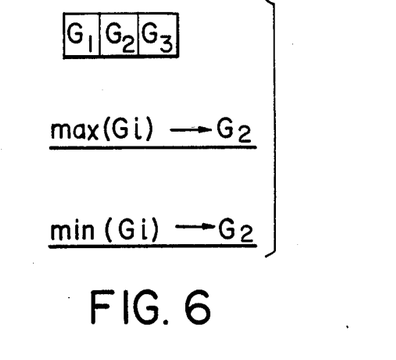
FIG. 6 illustrates local maximum and minimum filters.

In view of this a process is, performed for deleting a minimum brightness value into the center of a local area of an input image. For example, a minimum brightness value among brightnesses G1, G2 and G3 of three pixels as shown in FIG. 6 is buried into the center of the brightness values. This process is hereinafter called a local minimum filter process. By this process, an image $g1^{(1)}$ can be obtained whose bright portion was expanded as shown in FIG. 5C. After repeating this process n times, an image $g1^{(n)}$ can be obtained whose light character portion was deleted as shown in FIG. 5D. A difference image between the original input image g1 and the image $g1^{(n)}$ results in an image as shown in FIG. 5E where it is possible to clearly extract a character whose brightness is above 0 reference level.

The processed image is a difference between an area intended to be extracted and the background so that even if the brightness of the image varies, the difference does not vary. Therefore, the binarization threshold value used in extracting a character from the image can be set, for example, at $T_H$, shown in FIG. 5 without a need of complicated calculation.

The brightness of the background of a real image may not be flat but it may be inclined in many cases. If the local minimum filter process alone is used in processing such an image in the manner similar to FIG. 5, the inclined portion of the background is emphasized as having brightness above 0. Furthermore, character extraction is mainly directed to the extraction of only a narrow recess so that if a broad recess is present, the broad recess is emphasized by the local maximum filter processing. In view of this, a local maximum filter processing (contrary to the local minimum filter processing, this processing is intended to delete the maximum brightness value among G1, G2 and G3 as shown in FIG. 6) is further performed n times to obtain a difference between the input image and the processed image, thus properly emphasizing the area intended to be extracted.

Figure 7:
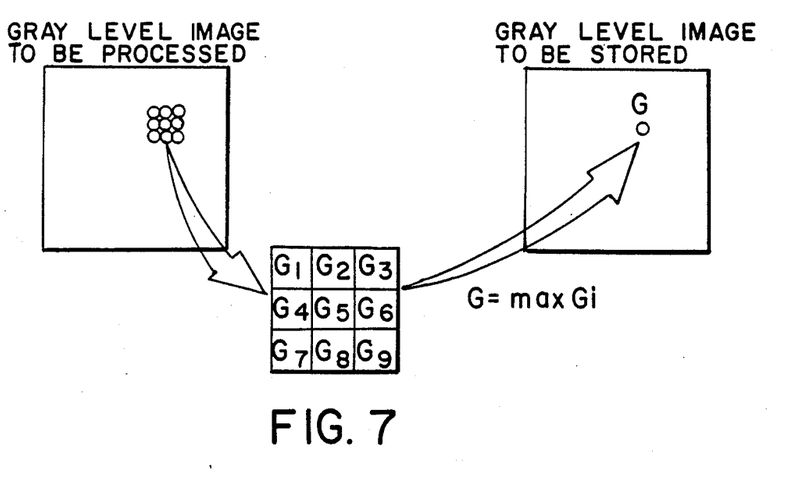
FIG. 7 illustrates a filter used in two-dimensional image processing.

In the above processing, the description including the filter processing has been directed to a one-dimensional image. However, a real image is two-dimensional so that a maximum or a minimum value is picked up from 3×3 pixels G1, G2, ..., G9 to bury it in the image, as shown in FIG. 7.

Figure 8A:
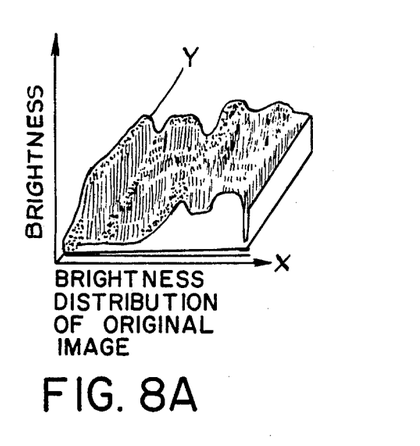
FIGS. 8A to 8C illustrate the normalization process of a gray level image in three-dimensional representation.
Figure 8B:
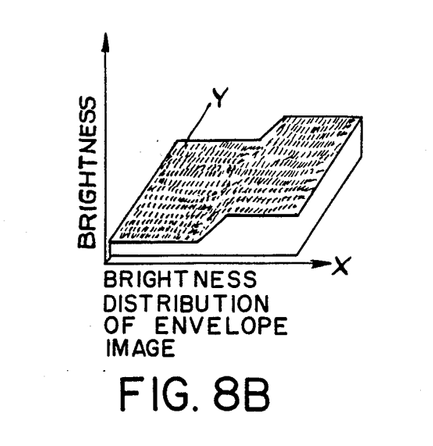
Figure 8C:
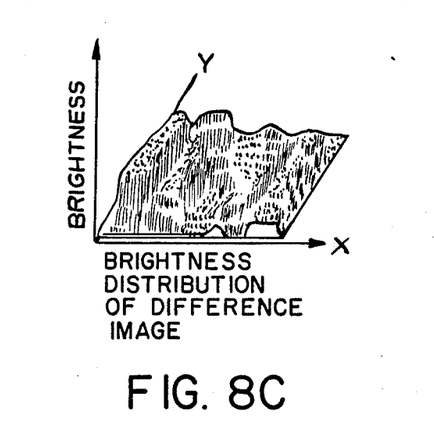

For the two-dimensional halftone image processing, two-dimensional image data of an original image (FIG. 8A) are processed in the manner as described before to obtain an envelope image (background image) (FIG. 8B). Particularly, the original image (FIG. 8A) is subjected to the local minimum filter processing n times at the local minimum filter processing circuit 7, and thereafter the obtained image is subjected to the local maximum filter processing n times at the local maximum filter processing circuit 8. Thereafter, a difference between the original image (FIG. 8A) and the envelope image (FIG. 8B) is obtained at the inter-image calculation circuit 9. As a result, a bright image as shown in FIG. 8C can be obtained which was normalized relative to a reference level "0". The above processing is hereinafter called a min-max subtraction method.

With the above-described processing method, it is possible to always obtain a constant contrast even under a change in illumination conditions. There are bright and dark characters such as white character in black background and black character in white background. Even in such a case, it is always possible to make a character bright and the background dark, by reversing the order of the local filter processings.

If there is less noise, another method may be used wherein a maximum value of a character line portion is converted into a constant brightness.

(ii) Extraction of Local Gray Level Feature Parameters at Sampling Points
  (a) local gray level feature parameters by multiplication/addition calculation.

Figures 9, 10:
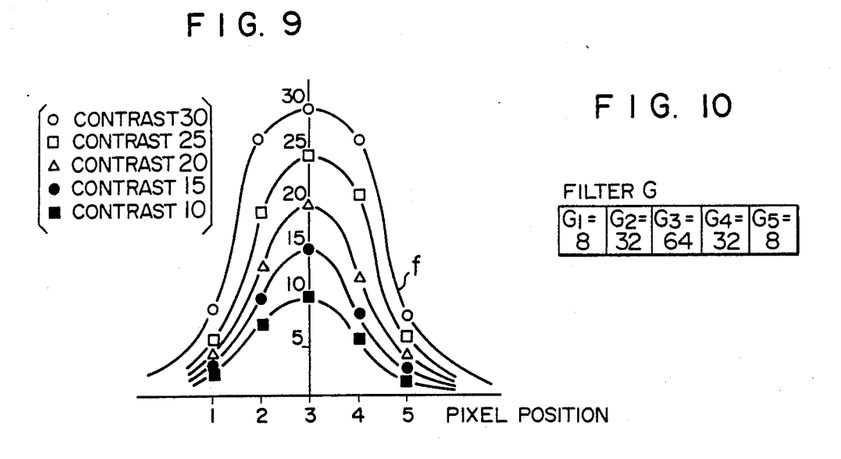
FIG. 9 shows changes in brightness of character lines.
FIG. 10 illustrates another example of a filter.
Figure 11:
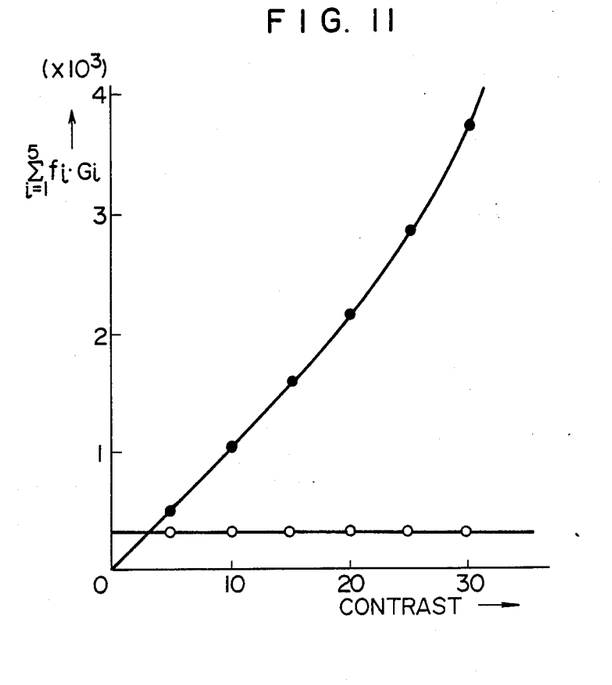
FIG. 11 shows a result of multiplication/addition performed as in FIGS. 9 and 10.

An example of a brightness distribution of an image obtained through the min-max subtraction method is shown in FIG. 9. This example represents the case where there is a character line whose contrast (a maximum of density differences between the background and the character line) ranges from 10 to 30. Shown in FIG. 11 is the result of a multiplication/addition calculation $\Sigma f \cdot G$ wherein a filter as shown in FIG. 10 is used with its pixel G3 aligned at the center (pixel position 3) of the character line. As shown in FIG. 11, as the contrast becomes large, the value $\Sigma f \cdot G$ becomes large (as shown by a curve with solid circles).

Generally, the background of a character becomes "0" by the min-max subtraction method. Assuming that all pixels have contrast of 2 levels taking noise into consideration, the value of $\Sigma f \cdot G$ becomes about 280 as shown by blank circles in FIG. 11. This value, although it becomes larger or smaller to some extent, is reasonable in most cases if noises are taken into consideration. As appreciated from FIG. 11, it can be seen that whether a character line is present or not can be easily discriminated if a contrast is 5 or more (e.g., if $\Sigma f \cdot G$ is 500 or more, then it can be judged as "ON").

Figure 12:
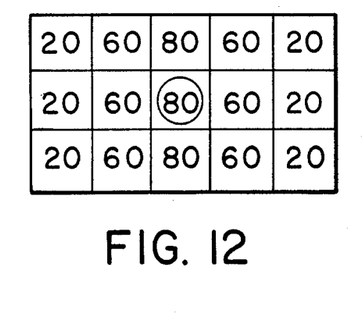
FIGS. 12 and 13 show still further examples of a filter.
Figure 13:
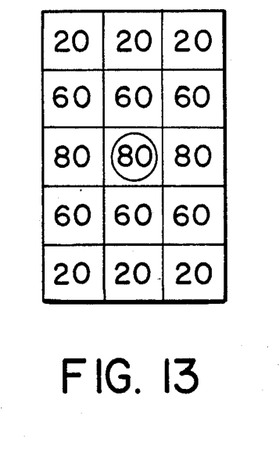

In the above embodiment, one line crossing over a character line has been used in the image processing. However in practice, it is more effective if a filter having a wider size as shown in FIG. 12 and FIG. 13 is used. For instance, in selecting a filter suitable for a shape of a check area shown in FIG. 22, a laterally elongated filter shown in FIG. 12 is used for the check areas 2, 3, 5 and 6 (vertical line check), and a vertically elongated filter shown in FIG. 13 is used for the check areas 1, 4 and 7 (horizontal line check). Use of such a wider filter ensures a stable judgement even if one line is missed or noises are generated since large value is an output provided that there is change of tone which change is similar to that of the filter, and it is possible to make stable judgement.

Figure 14A:
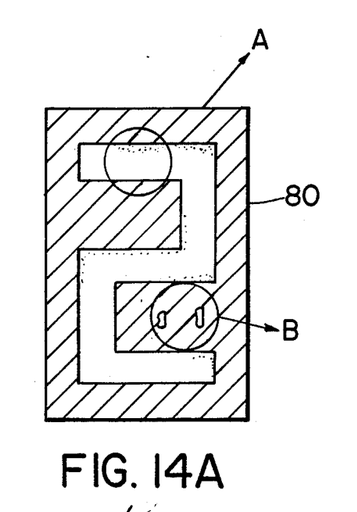
FIGS. 14A to 14C illustrate processing a gray level image having character blurs and noises.
Figure 14B:
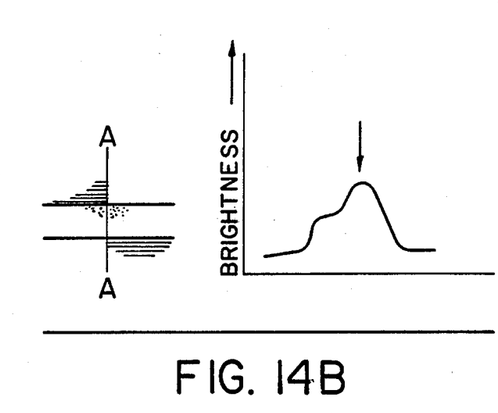
Figure 14C:
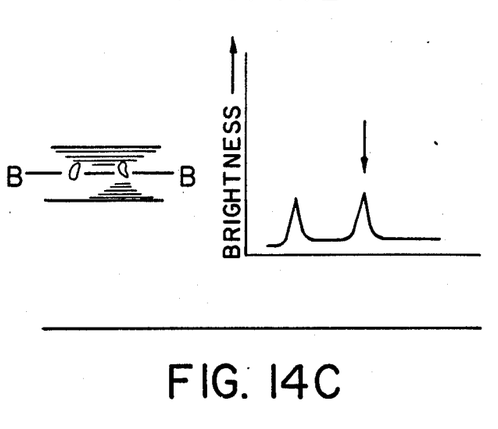

If such a wider filter is used, an image having a blur (A portion) or an image having a noise (B portion) shown in FIG. 14A can be properly dealt with. Namely, a brightness distribution shown in FIG. 14B is obtained for the image with A portion to judge it as an "ON" state, and a brightness distribution shown in FIG. 14C is obtained for the image with B portion to judge it as an "OFF" state.

As the local feature parameters at sampling (b) Other local image feature parameters points of an image to be obtained by the min-max subtraction method, the following values may also be used.

(1) The sum, average, dispersion value of densities, as described previously.

(2) A difference between two average values of image densities brighter or darker than a predetermined threshold value (e.g., a threshold value most suitable for use in binarization within the character rectangular area 80 shown in FIG. 14).

Next, the case where the position or size of a character changes will be described.

Figure 15:
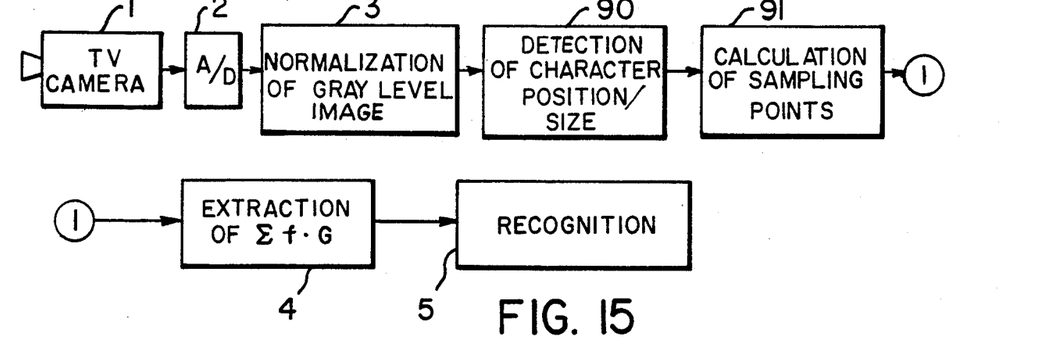
FIG. 15 is a block diagram of a pattern recognition method according to a third embodiment of the present invention.

FIG. 15 shows another embodiment of the present invention. This embodiment differs from the above-described embodiments in that a character position/size detection 90 and a sampling point calculation 91 are performed between the halftone image normalization process 3 and the sampling point local feature parameter extraction 4.

An image normalized from a gray level image or an original image received as a input from a television camera without shaving undergoes a detection of character position/size. Based on the detected data, sampling points of a check area are calculated. Local halftone feature parameter values $\Sigma f \cdot G$ are obtained using the coordinates of the calculated sampling points as the centers of multiplication/addition. Based on the parameter values, the "ON" or "OFF" state of a character line is determined for all the sampling points to thereby recognize the pattern.

Figure 16:
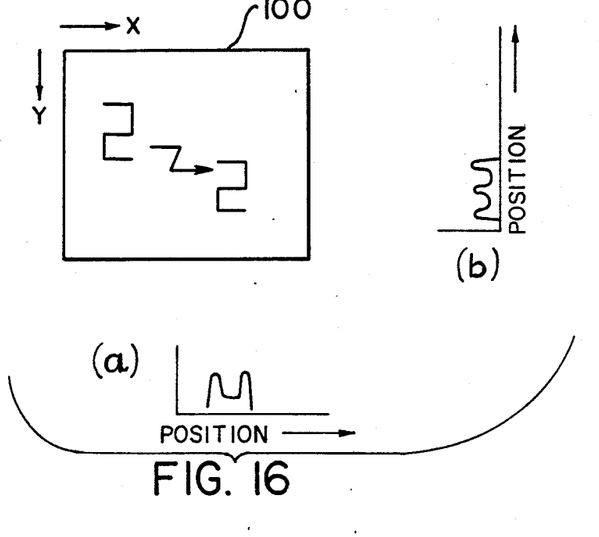
FIG. 16 illustrates a character position detection method.
Figure 17:
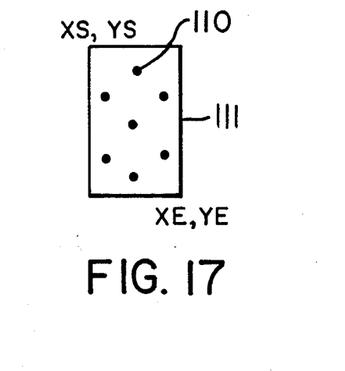
FIG. 17 illustrates how sampling points are obtained in a rectangular character area.
Figure 19:
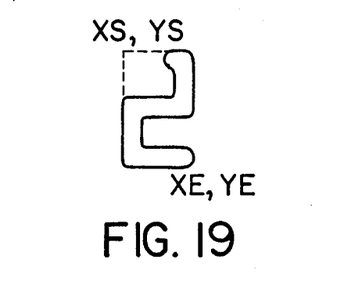

One method of detecting the character position/size is, as shown in FIG. 16, to extract from a gray level image 100 a gray level image distribution (accumulation of gray level data) projected on X-axis (FIG. 16 (a)) and a gray level image distribution projected on Y-axis (FIG. 16 (b)), to obtain a rectangular area surrounding a character (FIG. 17), and to determine sampling points 110 within the rectangular area 111. If the background of a character is not ordinary as shown in FIG. 18, a density frequency distribution (FIG. 18 (a)) in the character area is obtained to determine a binarization threshold value and binarize the character area image (FIG. 18 (b)). A rectangular area of a character can be determined by picking up one character from the binarized image. In this case, the binarized image may be deformed more or less as shown in FIG. 19, but the rectangular area as a whole rarely changes.

As described above, the binarized pattern is first obtained through a conventional character extraction to thereafter calculate the coordinates of sampling points by using the binarized pattern, thus enabling to obtain the above-described local gray level feature parameters.

In the above embodiments, local halftone feature parameter data $\Sigma f \cdot G$ obtained only at sampling points have been used as judgement reference. However, the invention is not limited thereto. For instance, an optimum value among several data near and around the sampling points may be used as the judgement reference. If a character position/size changes, a sampling point may sometimes be set at a point shifted from an originally intended one, depending on the accuracy of determining sampling points. In such a case, an area near and around the originally set sampling point, e.g., an area of 3×3 pixels may be used to calculate the values $\Sigma f \cdot G$ within the area and use a maximum value thereof as the judgement reference.

It is preferable to change the size of a filter G as the size of a character changes. For instance, if a character is large, a filter of 4×7 or 5×9 pixels may be used to reduce possible erroneous judgement. Obviously, the coefficients of a filter are preferably set so as to have a density change matching the width of a character line.

The size and coefficients of a filter for use in multiplication/addition are preferably set to match the density change of an actual character line, and the invention is not limited to those values and size shown in the accompanying figures.

According to the present invention, a pattern is recognized from a gray level image itself so that erroneous recognition to be caused by a change or unevenness of brightness of an input gray level image can be avoided. Further, a compact pattern recognition apparatus can be realized because of a simple processing method.

What is claimed is:

1. A method of recognizing a pattern of a gray level image comprising the steps of:
normalizing a gray level image to be processed;
extracting local feature parameters of said normalized gray level image at predetermined sampling points; and
identifying a pattern by using said extracted feature parameters in accordance with a predetermined recognition procedure.

2. A method according to claim 1, wherein said local gray level feature parameters are obtained at specific positions of said normalized gray level image through a multiplication/addition calculation by a local filter.

3. A method according to claim 1, wherein said local gray level feature parameters are the sum, average or dispersion values of densities at specific positions of said normalized gray level image within a local area.

4. A method according to claim 1, wherein said local gray level feature parameters are differences between two average densities, one average density being darker than said threshold value, said two average densities being obtained at specific positions of said normalized gray level image within a local area.

5. A method according to claim 1, wherein said local gray level feature parameters are obtained at specific positions of said normalized gray level image, said specific positions used in obtaining said local gray level feature parameters being determined by using a pattern to be recognized, said pattern being binarized prior to said determination.

6. A method according to claim 2, wherein said local gray level parameters at said specific positions are maximum values among values obtained near said specific positions.

7. A method according to claim 3, wherein said local gray level parameters at said specific positions are maximum values among values obtained near said specific positions.

8. A method according to claim 4, wherein said local gray level parameters at said specific positions are maximum values among values obtained near said specific positions.

9. A method according to claim 2, wherein the coefficients of said local filter for performing said multiplication/addition calculation are set so as to match changes in brightness of a character line of said pattern to be processed.

10. An apparatus for recognizing a pattern of a gray level image comprising;

a memory storing a gray level image having a change in brightness;

a normalization circuit normalizing the brightness of said gray level image to be processed;

an extraction circuit extracting local gray level feature parameters at specific positions of said normalized gray level image; and a recognition circuit identifying a pattern by using said feature parameters in accordance with a predetermined recognition procedure.

11. An apparatus according to claim 10, wherein said gray level image normalization circuit comprises a local maximum filter circuit, a local minimum filter circuit, and an inter-image calculation circuit obtaining a difference image between an image obtained by said local maximum and minimum filter circuits and an image to be processed.

* * * * *

UNITED STATES PATENT AND TRADEMARK OFFICE
CERTIFICATE OF CORRECTION

PATENT NO. : 4,941,192     Page 1 of 2
DATED : 10 July 1990
INVENTOR(S) : Tadaaki MISHIMA et al.

It is certified that error appears in the above-identified patent and that said Letters Patent is hereby corrected as shown below:

| Column | Line | |
|---|---|---|
| ABS. | 16 | After "predetermined" insert --recognition procedure--. |
| 1 | 11 | After "image); delete "image". |
| 3 | 20 | Before "large" insert --a--. |
| 4 | 17 | Change "65=8)." to --G5=8).--. |
| 4 | 30 | Before "large" insert --a--. |
| 4 | 36 | Change "is may" to --it may--. |
| 4 | 63 | Change "gray level" to --Gray Level--. |
| 5 | 15 | After "this" insert --,--; after "is" delete ",". |
| 6 | 11 | Change "character" to --characters--. |

UNITED STATES PATENT AND TRADEMARK OFFICE
CERTIFICATE OF CORRECTION

PATENT NO. : 4,941,192

DATED : July 10, 1990

INVENTOR(S) : Tadaaki Mishima et al.

It is certified that error appears in the above-identified patent and that said Letters Patent is hereby corrected as shown below:

| | | |
|---|---|---|
| 6 | 12 | Change "character" to --characters--. |
| 6 | 37 | After "have" insert --a--. |
| 7 | 22 | Change "a" to --an--. |
| 7 | 57 | Before "judgement" insert --a--. |
| 9 | | Change double-spacing to single-spacing. |

Signed and Sealed this

Thirty-first Day of December, 1991

Attest:

HARRY F. MANBECK, JR.

Attesting Officer

Commissioner of Patents and Trademarks